United States Patent
Ohkado et al.

(10) Patent No.: US 11,954,918 B2
(45) Date of Patent: Apr. 9, 2024

(54) OBJECT DETECTION DEVICE, OBJECT DETECTION METHOD, AND STORAGE MEDIUM

(71) Applicant: DENSO CORPORATION, Kariya (JP)

(72) Inventors: Makoto Ohkado, Kariya (JP); Naohiro Fujiwara, Kariya (JP)

(73) Assignee: DENSO CORPORATION, Kariya (JP)

( * ) Notice: Subject to any disclaimer, the term of this patent is extended or adjusted under 35 U.S.C. 154(b) by 855 days.

(21) Appl. No.: 17/012,046

(22) Filed: Sep. 4, 2020

(65) Prior Publication Data

US 2020/0401825 A1 Dec. 24, 2020

Related U.S. Application Data

(63) Continuation of application No. PCT/JP2019/008953, filed on Mar. 6, 2019.

(30) Foreign Application Priority Data

Mar. 7, 2018 (JP) ................. 2018-040816

(51) Int. Cl.
G06T 7/70 (2017.01)
G01S 13/931 (2020.01)
G01S 17/931 (2020.01)
G06V 20/58 (2022.01)

(52) U.S. Cl.
CPC .......... G06V 20/584 (2022.01); G01S 13/931 (2013.01); G01S 17/931 (2020.01); G06T 7/70 (2017.01); *G06T 2207/30261* (2013.01)

(58) Field of Classification Search
CPC ... G06V 20/584; G01S 13/931; G01S 17/931; G01S 13/865; G01S 13/867; G01S 2013/9323; G01S 2013/9324; G01S 2013/93271; G01S 15/86; G01S 15/931; G01S 15/87; G01S 17/86; G01S 17/87; G06T 7/70; G06T 2207/30261; G08G 1/16

See application file for complete search history.

(56) References Cited

U.S. PATENT DOCUMENTS

| | | | |
|---|---|---|---|
| 2014/0035775 A1 | 2/2014 | Zeng et al. | |
| 2016/0116589 A1* | 4/2016 | Fukuman | G01S 15/588 367/89 |
| 2019/0132555 A1* | 5/2019 | Chu | H04N 7/181 |

FOREIGN PATENT DOCUMENTS

| | | |
|---|---|---|
| DE | 10 2015 201747 A1 | 8/2016 |
| EP | 3 225 456 A1 | 10/2017 |
| JP | H06-174839 A | 6/1994 |
| JP | 2000-123298 A | 4/2000 |
| JP | 2001-63500 A | 3/2001 |
| JP | 2015-125760 A | 7/2015 |
| JP | 2016-80539 A | 5/2016 |

* cited by examiner

*Primary Examiner* — Chuong A Ngo
(74) *Attorney, Agent, or Firm* — MASCHOFF BRENNAN

(57) ABSTRACT

An object detection device includes: a camera ECU that measures the bearing of an object by detecting the object from an image captured by a camera and identifying the direction toward the object; a sonar that measures the distance to the object existing around the vehicle; and a position identification unit that identifies the position of the object by combining the measured bearing data and distance data on a grid map that is based on a polar coordinate system and identifying the grid cell where the object exists on the grid map.

5 Claims, 10 Drawing Sheets

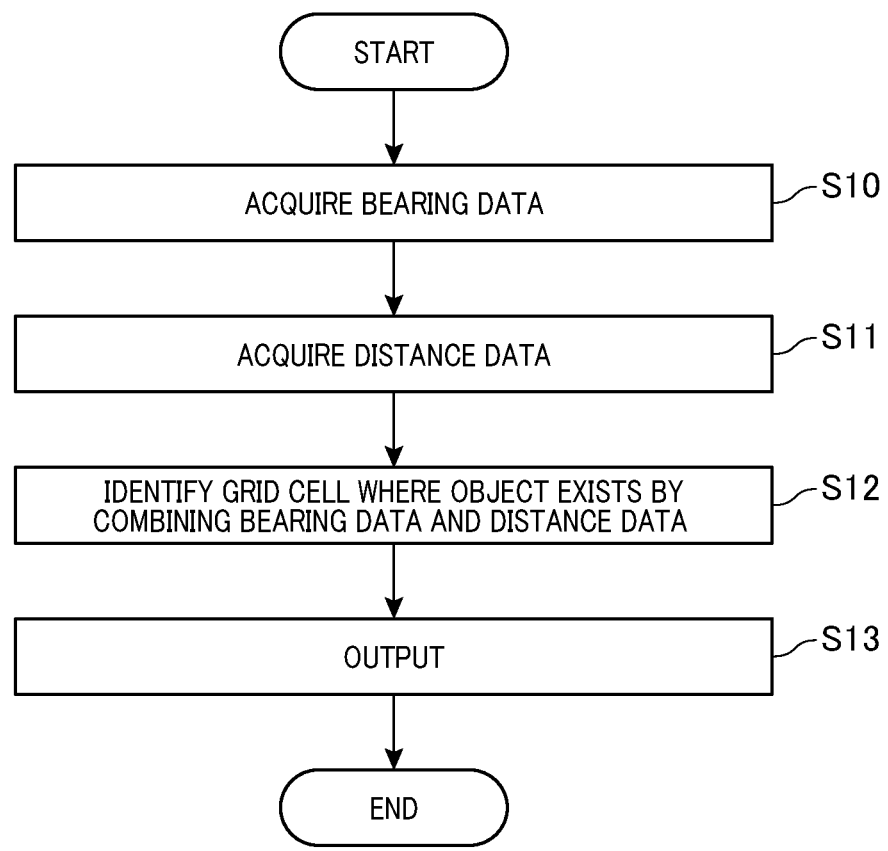

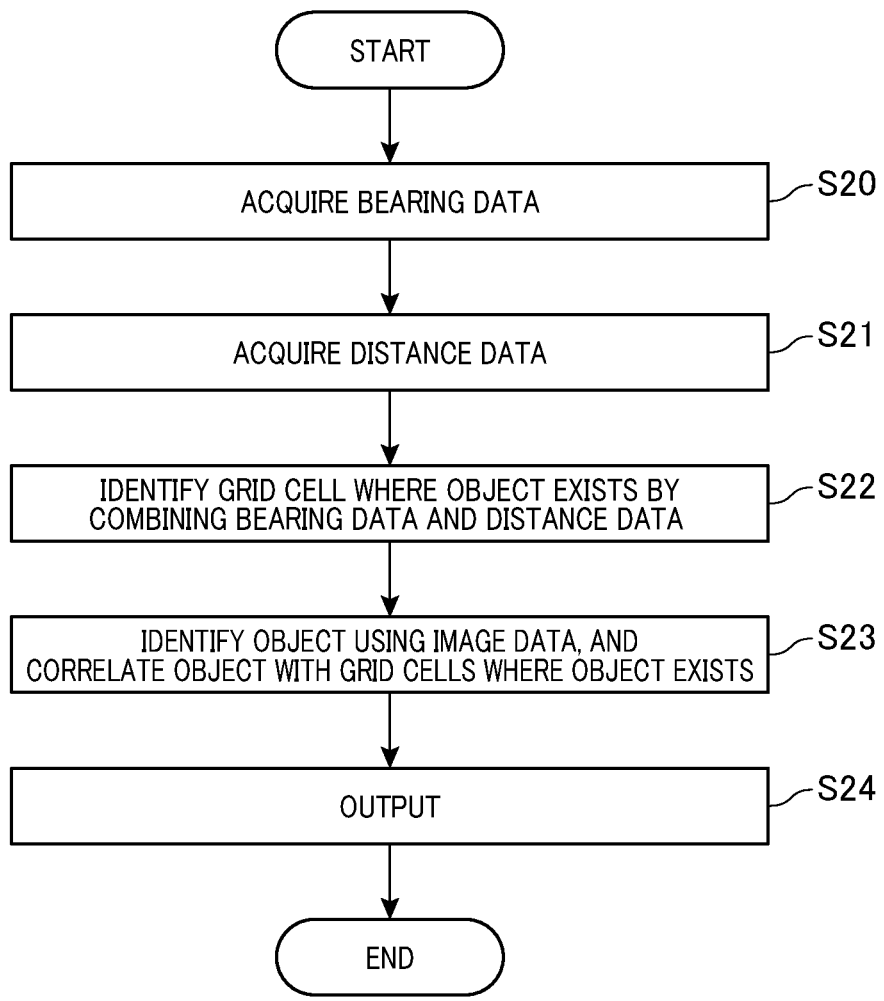

OBJECT DETECTION DEVICE, OBJECT DETECTION METHOD, AND STORAGE MEDIUM

CROSS-REFERENCE TO RELATED APPLICATION

The present application is a continuation application of International Application No. PCT/JP2019/008953, filed Mar. 6, 2019, which claims priority to Japanese Patent Application No. 2018-040816, filed Mar. 7, 2018. The contents of these applications are incorporated herein by reference in their entirety.

BACKGROUND

1. Technical Field

The present disclosure relates to an object detection technique for detecting an object existing around a vehicle.

2. Related Art

Techniques for detecting an object existing around a vehicle have been studied and developed for vehicle drive assist, automatic drive control, or the like. For example, there is a technique for measuring not only the distance to a front obstacle but also the lateral position of the obstacle to ensure that the vehicle is safely driven on the basis of the result of these measurements. There is a technique for recognizing a three-dimensional object with superior resolution.

SUMMARY

The present disclosure provides an object detection device. As an aspect of the present disclosure, an object detection device includes a bearing sensor, a distance sensor, and a position identification unit. The bearing sensor measures a bearing of an object existing around a vehicle. The distance sensor measures a distance from the vehicle to the object. The position identification unit identifies a position of the object by combining bearing data measured using the bearing sensor and distance data measured using the distance sensor. The position identification unit may have a grid map that is based on a polar coordinate system whose center is the vehicle, and may identify a grid cell where the object exists on the grid map on the basis of the distance data and the bearing data.

BRIEF DESCRIPTION OF THE DRAWINGS

In the accompanying drawings:

FIG. 5 is a flowchart illustrating a process that is executed in the object detection device according to the first embodiment;

FIG. 7 is a flowchart illustrating a process that is executed in an object detection device according to the second embodiment;

DETAILED DESCRIPTION OF THE PREFERRED EMBODIMENTS

Figure 1:
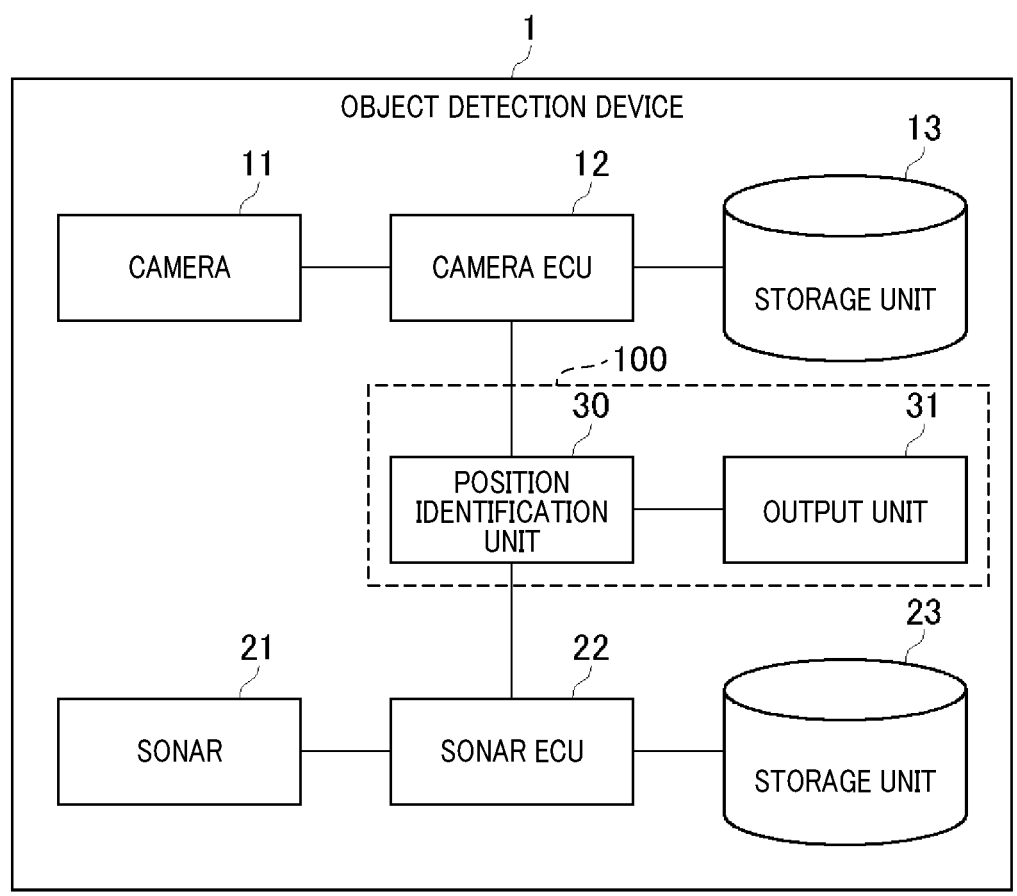
FIG. 1 is a diagram illustrating the configuration of an object detection device according to the first embodiment.

JP 2000-123298 A (Japanese Unexamined Patent Application Publication No. 2000-123298) has disclosed a technique for measuring not only the distance to a front obstacle but also the lateral position of the obstacle to ensure that the vehicle is safely driven on the basis of the result of these measurements. For the purpose of detecting the lateral extent of an obstacle, this technique involves calculating the lateral positions of two obstacles on the basis of image information and distance information, and measuring the two-dimensional positions of the two obstacles on the basis of the calculated lateral positions and distance information.

JP H6-174839 A (Japanese Unexamined Patent Application Publication No. H6-174839) has disclosed a technique for recognizing a three-dimensional object with superior resolution. According to this technique, first, the planar distribution of distance information relative to the surface of an object is measured using ultrasound sensors arranged on a planar surface, and a first stereo image of the object is extracted on the basis of the measured distance information. Next, a planar image of the object is extracted from an image captured using a camera on the basis of the position information of the first stereo image. Then, the extracted planar image is combined with the first stereo image into a precise second stereo image.

The present disclosure provides a technique for detecting an object easily on the basis of two types of one-dimensional information: bearing data and distance data.

The present disclosure employs the flowing technical configuration in order to achieve the above object. Note that reference signs in parentheses indicate exemplary correspondence relations with components in the embodiments each described later as an aspect.

An object detection device according to an aspect of the technique of the present disclosure includes: a bearing sensor that measures a bearing of an object existing around a vehicle; a distance sensor that measures a distance from the vehicle to the object; and a position identification unit that identifies a position of the object by combining bearing data measured using the bearing sensor and distance data measured using the distance sensor. The position identification unit may have a grid map that is based on a polar coordinate system whose center is the vehicle, and may identify a grid cell where the object exists on the grid map on the basis of the distance data and the bearing data.

An object detection device according to the present disclosure combines, in a predetermined coordinate space, different types of one-dimensional information: bearing data measured using the bearing sensor and distance data measured using the distance sensor. As a result, the data region shared by the bearing data and the distance data is identified. Consequently, the position where the object exists can be identified easily on the basis of the one-dimensional information on bearing and the one-dimensional information on distance. For example, the object detection device identifies, on a grid map that is based on a polar coordinate system, a grid region including bearing data measured using the bearing sensor and a grid region including distance data measured using the distance sensor. Then, a shared grid cell (grid cell where the object exists) may be identified from the identified two grid regions.

An object detection device according to the present disclosure may include a plurality of the distance sensors with different detection ranges, and the position identification unit may identify the position of the object on the basis of the bearing data, the distance data, and data on the detection ranges of the distance sensors. With this configuration, the object detection device according to the present disclosure can identify the positions of a plurality of objects that may exist around the vehicle on the basis of distance data and bearing data.

An object detection device according to the present disclosure may include: a bearing sensor ECU that controls the bearing sensor; and a distance sensor ECU that controls the distance sensor. The bearing sensor ECU may store, in a memory, the bearing data measured using the bearing sensor. The distance sensor ECU may store, in a memory, the distance data measured using the distance sensor. The position identification unit may identify the position of the object by combining the bearing data stored in the bearing sensor ECU and the distance data stored in the distance sensor ECU. This configuration for storing distance data is advantageous in that the distance data can be used for vehicle control (short-range PCS, erroneous stepping prevention, and the like), for example.

An object detection device according to the present disclosure includes: a camera that captures an image of an object existing around a vehicle; an image processing unit that detects the object from the image captured using the camera, and identifies a direction toward the object; a distance sensor that measures a distance from the vehicle to the object; and a position identification unit that identifies a grid cell where the object exists on a grid map that is based on a polar coordinate system whose center is the vehicle on the basis of bearing data identified by the image processing unit and distance data measured using the distance sensor. In response to the object being detected in a plurality of grid cells, the position identification unit identifies a same object existing over a plurality of grid cells on the basis of a result of detection of the object from image data obtained from the image processing unit. With this configuration, the object detection device according to the present disclosure can determine whether the objects detected in the plurality of grid cells are the same object.

An object detection method according to the present disclosure includes: a step of acquiring bearing data on a bearing of an object existing around a vehicle from a bearing sensor provided on the vehicle; a step of acquiring distance data on a distance from the vehicle to the object from a distance sensor provided on the vehicle; and a step of identifying a position of the object by combining the bearing data and the distance data.

A storage medium according to the present disclosure contains thereon a program for detecting an object existing around a vehicle, the program is configured to cause an ECU to execute the program including instructions, the instructions includes: acquiring bearing data on a bearing of the object existing around the vehicle from a bearing sensor provided on the vehicle; acquiring distance data on a distance from the vehicle to the object from a distance sensor provided on the vehicle; and identifying a position of the object by combining the bearing data and the distance data.

The technique of the present disclosure can identify the position where an object exists with a simple configuration using one-dimensional information obtained from a bearing sensor and a distance sensor.

Hereinafter, embodiments that are aspects of the technique of the present disclosure will be described with reference to the drawings.

First Embodiment

FIG. 1 shows a diagram illustrating the configuration of an object detection device 1 according to the first embodiment. The object detection device 1 is used mounted on a vehicle, and has a function of detecting an object existing around the vehicle. The object detection device 1 has a camera 11, a sonar 21, a position identification unit 30, and an output unit 31.

The camera 11 is connected to a camera ECU 12. The camera ECU 12 has an image processing function (corresponding to an image processing unit). The camera ECU 12 performs a predetermined image process on an image captured using the camera 11, and detects an object from the captured image. The camera ECU 12 obtains data on the bearing of the detected object. In the present embodiment, an azimuth, which indicates a bearing using the angle relative to the reference bearing, is calculated and used as data on the bearing. In this manner, the camera ECU 12 constitutes a bearing sensor using the camera 11 and the image processing function. The bearing data obtained by the camera ECU 12 are stored in a storage unit 13 connected to the camera ECU 12. Note that the storage unit 13 is a storage device, e.g. a memory or the like.

The sonar 21 is an instrument that measures the distance to an object using ultrasound, for example, and corresponds to a distance sensor. The sonar 21 is connected to a sonar ECU 22. The sonar ECU 22 obtains data on the distance to the object from the result of detection by the sonar 21. In the present embodiment, the time required from transmission of radio waves to reception of reflected waves from the object is converted to a distance, which is used as data on the distance. The distance data obtained by the sonar ECU 22 are stored in a storage unit 23 connected to the sonar ECU 22. Note that the storage unit 23 is a storage device, e.g. a memory or the like.

The position identification unit 30 acquires data on the bearing of the object from the camera ECU 12 and acquires data on the distance to the object from the sonar ECU 22. The position identification unit 30 detects the position of the object on the basis of the bearing data and the distance data.

Figure 2A:
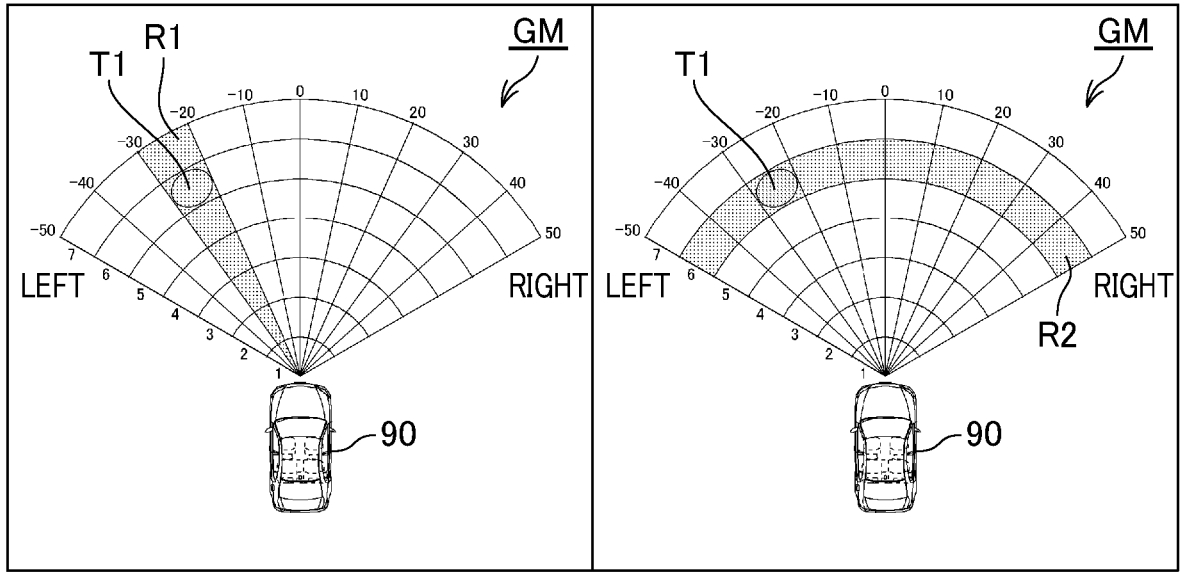
FIG. 2A is a diagram illustrating the principle of object position detection.
Figure 2B:
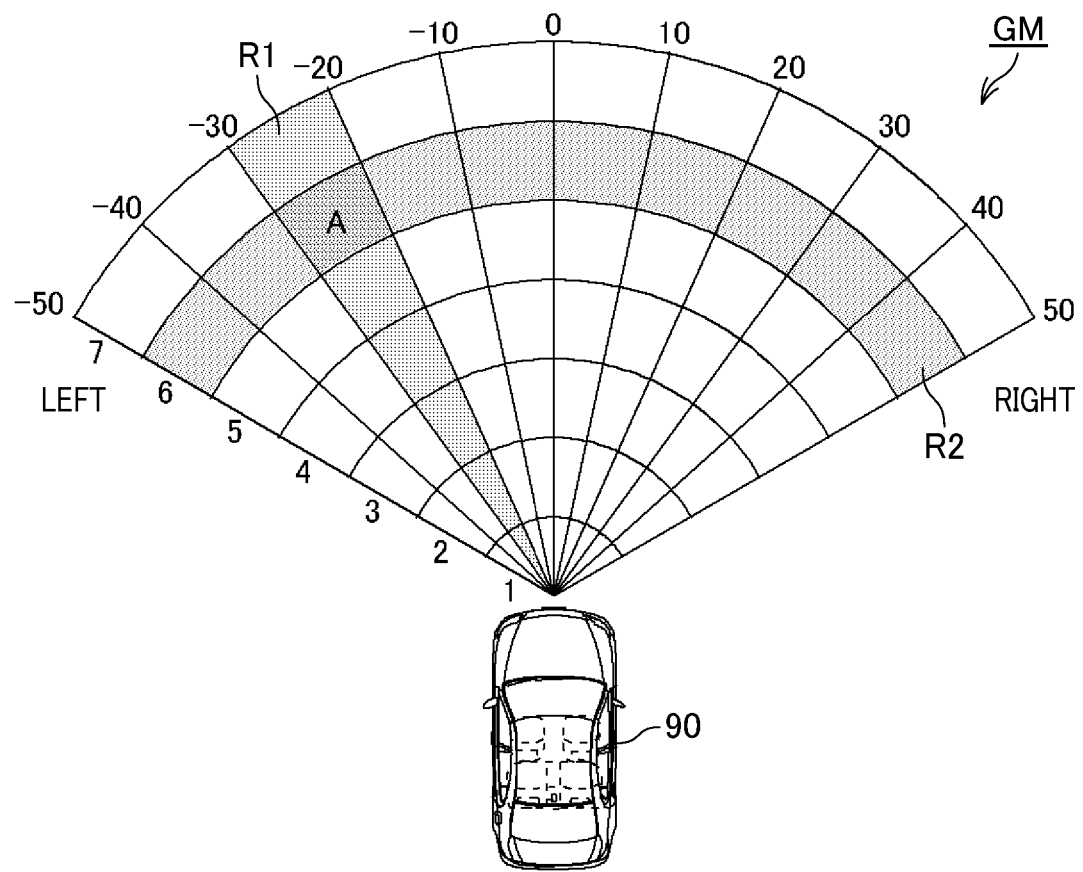
FIG. 2B is a diagram illustrating the principle of object position detection.

FIG. 2 shows diagrams illustrating the principle of object position detection by the position identification unit 30. FIG. 2A shows a diagram illustrating grid maps as viewed from a vehicle. The position identification unit 30 has a grid map GM that is based on a polar coordinate system whose origin (pole) is the installation position of the camera 11 and the sonar 21 on a vehicle 90. The grid map GM has a bearing coordinate axis and a distance coordinate axis. Consequently, it is possible to combine (fuse), on the grid map GM, the bearing data and the distance data. The position identification unit 30 identifies, on the grid map GM, a grid region R1 (first grid region) including the bearing data of the object obtained by the camera ECU 12 and a grid region R2 (second grid region) including the distance data of the object obtained by the sonar ECU 22. Then, the position identification unit 30 identifies, as the grid cell where the object exists, a grid cell A where the identified two grid regions R1 and R2 overlap each other. In other words, the position identification unit 30 identifies the shared grid cell A from the identified two grid regions R1 and R2. In the example illustrated in FIG. 2A, an object T1 exists diagonally ahead of the vehicle 90 on the left. In this case, the distance to the object T1 cannot be identified from the bearing data (azimuth) obtained from the image captured by the camera 11. However, the bearing data show that the object T1 is located within the third grid region R1 from the left (in the range of −20° to −30°) on the grid map GM. Similarly, the direction toward the object T1 cannot be identified from the distance data obtained from the result of detection by the sonar 21. However, the distance data show that the object T1 is located within the sixth concentric grid region R2 from the polar-coordinate origin on the grid map GM. As illustrated in FIG. 2B, the position identification unit 30 superimposes the grid region R1 including the bearing data and the grid region R2 including the distance data on the polar-coordinate grid map GM. Consequently, the object T1 is found to exist in the grid cell A, which is the region where the grid region R1 for the bearing data and the grid region R2 for the distance data overlap each other. In other words, the object T1 is found to exist in the data region shared by the bearing data and the distance data. This is the principle of object detection by the object detection device 1 according to the present embodiment.

Figure 3:
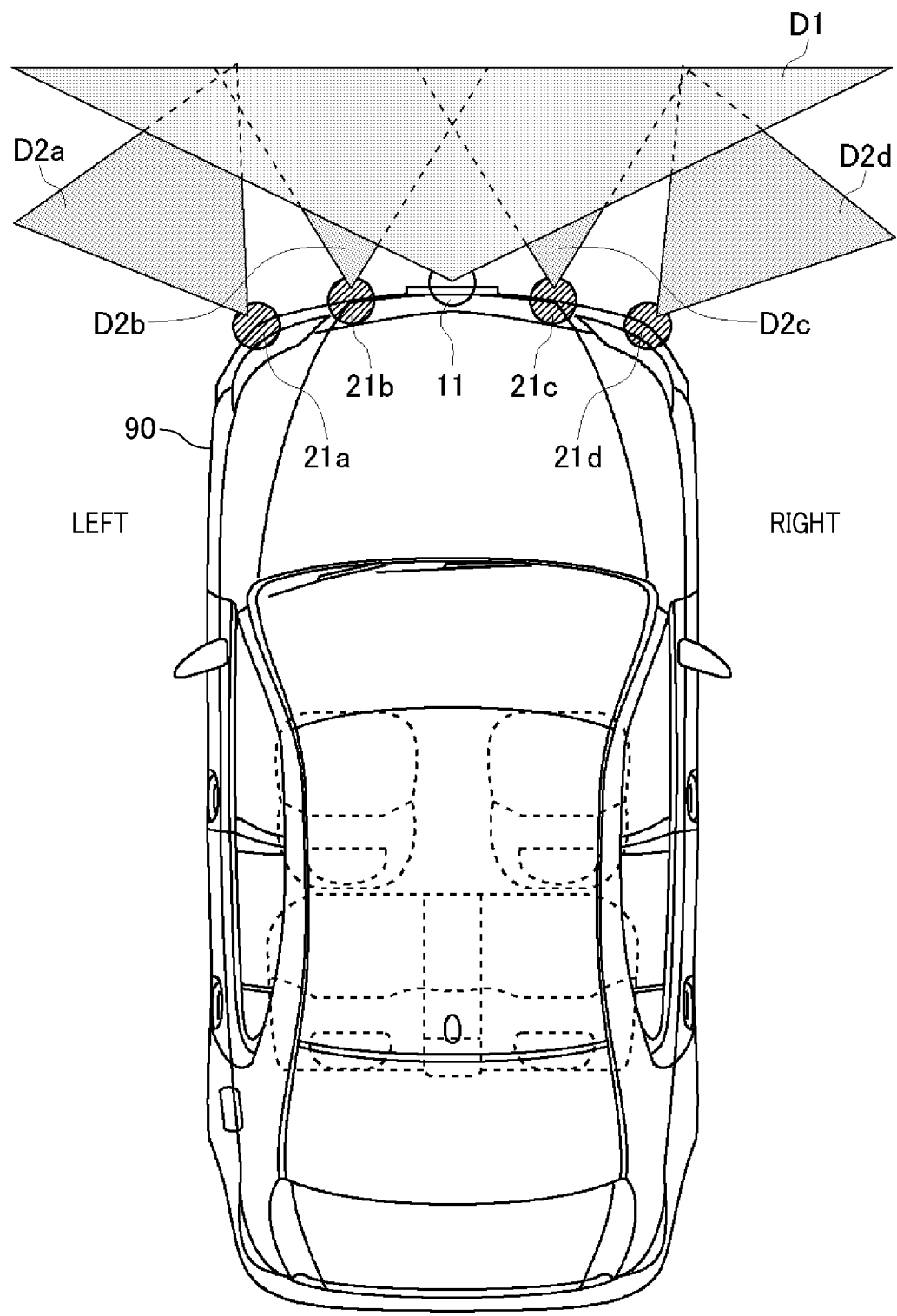
FIG. 3 is a diagram illustrating an example of positions of a camera and sonars on a vehicle.

The object detection device 1 according to the present embodiment includes a plurality of sonars 21. FIG. 3 shows a diagram illustrating an example of the camera 11 and the sonars 21a to 21d attached to the vehicle 90. The sonars 21a and 21b are provided on the left side of the camera 11, and the sonars 21c and 21d are provided on the right side of the camera 11. This configuration enables detection of the position of an object existing in the range where a capture range D1 of the camera 11 and detection ranges D2a to D2d of the sonars 21a to 21d overlap. The maximum detection ranges D2a to D2d of the sonars 21a to 21d differ. The installation position of the camera 11 is different from the installation positions of the sonars 21a to 21d. In consideration of this point, distance data detected by the sonars 21a to 21d are converted to the polar coordinate system of bearing data detected by the camera 11.

Figure 4A:
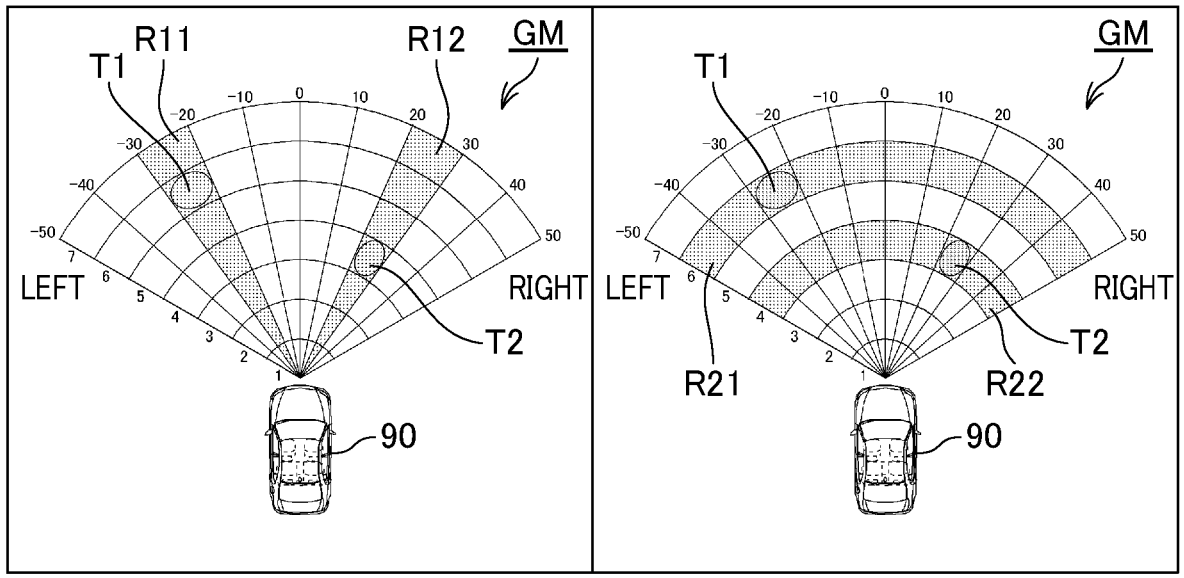
FIG. 4A is a diagram illustrating an example of object detection for the case where a plurality of objects exist.
Figure 4B:
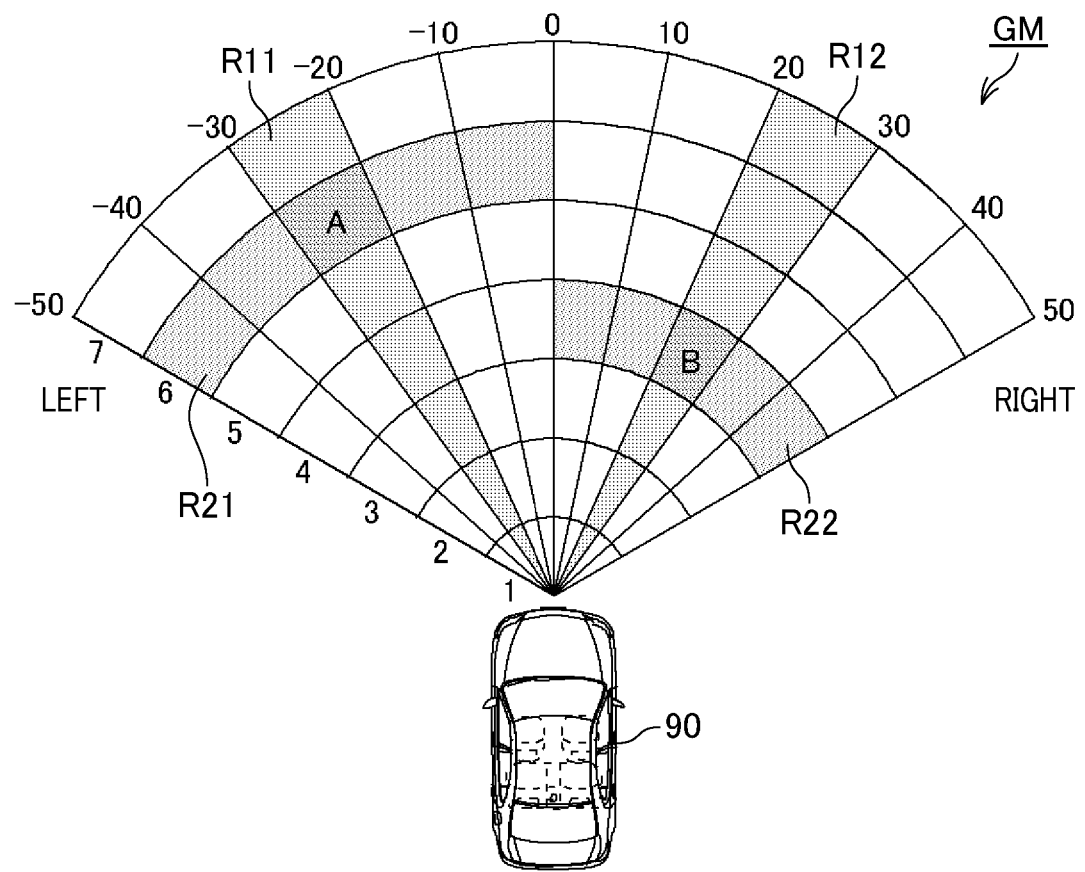
FIG. 4B is a diagram illustrating an example of object detection for the case where a plurality of objects exist.

Because the object detection device 1 according to the present embodiment includes the plurality of sonars 21 with different detection ranges, the positions of a plurality of objects that may exist around the vehicle 90 can be detected. FIG. 4 shows diagrams for explaining object detection for the case where two objects T1 and T2 exist. FIG. 4A shows a diagram illustrating grid maps GM as viewed from the installation position of the camera 11. In the example illustrated in FIG. 4A, the objects T1 and T2 exist diagonally ahead of the vehicle 90 on the left and right, respectively. In this case, the bearing data obtained from the image captured by the camera 11 show that the object T1 is located within the third grid region R11 from the left (in the range of −20° to −30°) on the grid map GM. The bearing data also show that the object T2 is located within the third grid region R12 from the right (in the range of 20° to 30°). Suppose that the sonar 21b provided on the left side of the camera 11 has the detection range D2b extending diagonally forward left, and the sonar 21c provided on the right side of the camera 11 has the detection range D2c extending diagonally forward right. The object T1 is detected by the left sonar 21b, and its distance data show that the object T1 is located within the sixth concentric grid region R21 from the polar-coordinate origin on the grid map GM. Therefore, as illustrated in FIG. 4B, the object detection device 1 superimposes the third grid region R11 from the left (the range of −20° to −30°) and the sixth concentric grid region R21 from the polar-coordinate origin on the grid map GM. Consequently, the object detection device 1 detects that the object T1 exists in the grid cell A where the two grid regions R11 and R21 overlap each other. Similarly, the right sonar 21c detects the object T2, and its distance data show that the object T2 is located within the fourth concentric grid region R22 from the polar-coordinate origin. However, the right sonar 21c has the detection range D2c extending diagonally forward right. Therefore, the object detected by the right sonar 21c is found to be different from the object T1 located within the third grid region R11 from the left (in the range of −20° to −30°). The object detection device 1 superimposes the fourth concentric grid region R22 from the polar-coordinate origin and the third grid region R12 from the right (the range of 20° to 30°) on the grid map GM in the same manner as when detecting the object T1. Consequently, the object detection device 1 detects that the object T2 exists in a grid cell B where the two grid regions R12 and R22 overlap each other. Thus, the object detection device 1 can identify the positions of a plurality of objects that may exist by considering the detection ranges D2a to D2d of the sonars 21a to 21d.

FIG. 5 shows a flowchart illustrating an object detection process that is executed in the object detection device 1. The object detection device 1 detects an object from an image captured by the camera 11 using the camera ECU 12, and acquires data on the bearing (azimuth) of the object (S10). The camera ECU 12 stores the acquired data in the storage unit 13. The object detection device 1 acquires data on the distance to the location of the object from the result of detection by the sonar 21 using the sonar ECU 22 (S11). The sonar ECU 22 stores the acquired data in the storage unit 23.

Next, the object detection device 1 identifies the grid cell where the object exists by combining (fusing), on the grid map GM using the position identification unit 30, the bearing data and the distance data provided by the sonar 21 whose detection range includes the bearing indicated by the bearing data (S12). Specifically, the position identification unit 30 identifies the grid region R1 including the bearing data and the grid region R2 including the distance data on the polar-coordinate grid map GM. Then, the position identification unit 30 identifies the shared grid cell A from the identified two grid regions R1 and R2. The object detection device 1 outputs data on the identified grid cell as the result of object detection to an external device via the output unit 31 (S13). The external device can be, for example, a drive control device (not illustrated) or the like. Consequently, the drive control device performs various types of drive control for the vehicle on the basis of the position data of the detected object (output data from the object detection device 1). As a result, for example, in a case where an object is detected in the traveling direction of the vehicle, a traveling path for avoiding the object is calculated so that the traveling of the vehicle can be controlled, or in a case where an object is detected at close range from the vehicle, the vehicle can be stopped. Note that the drive control device controls the operation of the vehicle in the following manner. The vehicle includes various actuators such as a steering drive device, an accelerator drive device, and a brake drive device. The steering drive device rotationally drives the steering shaft. The accelerator drive device drives the accelerator pedal. The brake drive device drives the brake pedal. These drive devices are communicably connected to the drive control device. The drive control device detects output from a vehicle speed sensor, a steering angle sensor, an accelerator sensor, and a brake sensor, and generates control signals for various actuators to be driven. The drive control device transmits the generated control signals to the actuators. Consequently, the drive control device controls the driving of the steering drive device, the accelerator drive device, the brake drive device, and the like to control operation of the vehicle.

Figure 6:
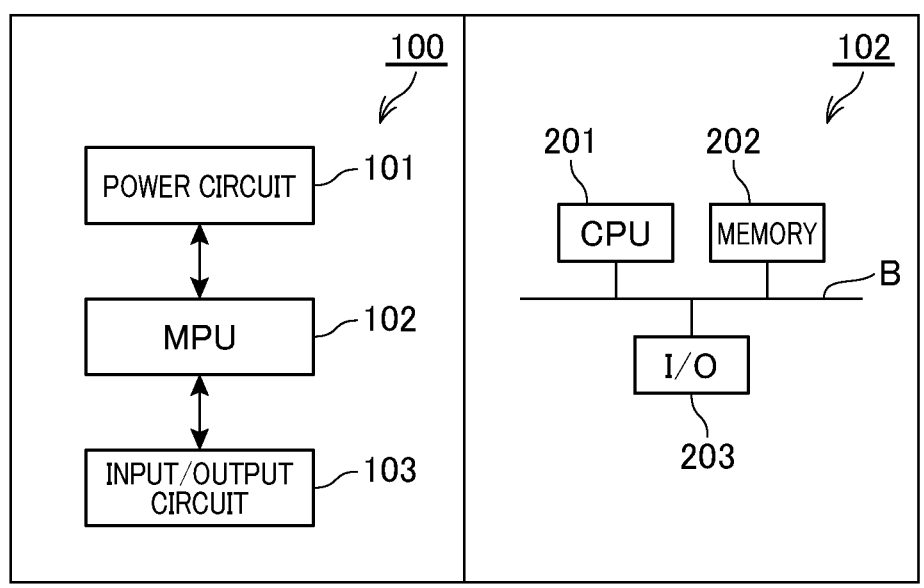
FIG. 6 is a diagram illustrating the schematic configuration of an ECU.

The function of the position identification unit 30 for implementing the above-described operation of the object detection device 1 is implemented by executing a program in an electronic control unit (ECU). A non-transitory tangible computer-readable medium that stores such a program is also included in the scope of the present disclosure. Here, the schematic configuration of an ECU that implements the function of the position identification unit 30 will be described using FIG. 6. Note that the following schematic configuration is also applied to other ECUs 12 and 22. An ECU 100 includes a power circuit 101, an MPU 102, an input/output circuit 103, and the like. The power circuit 101 controls power supply to the MPU 102. The input/output circuit 103 controls signal input to the MPU 102 and signal output from the MPU 102. The output function of the input/output circuit 103 corresponds to the output unit 31. The MPU 102 includes a CPU 201, a memory 202, an I/O unit 203, and the like. The CPU 201 is a processing device including a computation circuit, a control circuit, a register, and the like. The memory 202 is a storage device such as a semiconductor memory, e.g. ROM or RAM. The I/O unit 203 is an input/output interface for an external device. These are connected to a bus B so as to be communicable with each other. In the ECU 100, for example, a program stored in the memory 202 is read, and the read program is executed by the CPU 201. With such a configuration, the ECU 100 provides various functions. Note that the position identification unit 30 may be implemented by a hardware configuration, instead of being implemented by the aforementioned software configuration. The position identification unit 30 can be implemented using, for example, an electronic circuit including LSI and a memory. Furthermore, the position identification unit 30 may be implemented by combining a software configuration (function provided by an ECU) and a hardware configuration (function provided by an electronic circuit).

The object detection device 1 according to the present embodiment maps the bearing of the object detected by the camera 11 and the distance to the object detected by the sonar 21 on the grid map GM that is based on a polar coordinate system whose origin is the installation position of the camera 11 and the sonar 21. Then, the object detection device 1 identifies, as the position of the object, the grid cell where the result of bearing mapping (grid region including the bearing data) and the result of distance mapping (grid region including the distance data) overlap each other on the grid map GM. Consequently, the advantages of the camera 11 and the sonar 21 are combined, so that the position of the object can be detected easily and accurately.

The object detection device 1 according to the present embodiment includes the plurality of sonars 21 with different detection ranges. Consequently, the positions of a plurality of objects that may exist around the vehicle 90 can be detected by superimposing (combining) the results of detection by the camera 11 and the sonars 21 on the grid map GM.

Second Embodiment

Next, an object detection device according to the second embodiment will be described. The basic configuration of the object detection device according to the present embodiment is the same as that according to the first embodiment (see FIG. 1). The object detection device according to the present embodiment is different from that according to the first embodiment in the following respects. The object detection device according to the present embodiment is configured such that when objects are detected in a plurality of grid cells, the position identification unit 30 determines whether the objects detected in the plurality of grid cells are the same object on the basis of the result of object detection from image data. In response to the objects detected in the plurality of grid cells being determined to be the same object, the position identification unit 30 correlates the object detected from image data received from the camera ECU 12 with the grid cells where the object exists. The object detection device according to the present embodiment uses the result of object detection (result of image analysis) from image data in addition to bearing data and distance data in order to increase the accuracy of the technique of identifying the position of the object on the basis of bearing data and distance data. In the following description, components identical to those in the first embodiment are denoted by the same reference signs, and descriptions thereof are omitted.

FIG. 7 shows a flowchart illustrating an object detection process that is executed in the object detection device 1 according to the present embodiment. The object detection process according to the present embodiment is fundamentally the same as the object detection process that is executed in the object detection device 1 according to the first embodiment. Steps S20 to S22 and S24 illustrated in FIG. 7 correspond to steps S10 to S13 in FIG. 5, respectively.

Figure 8A:
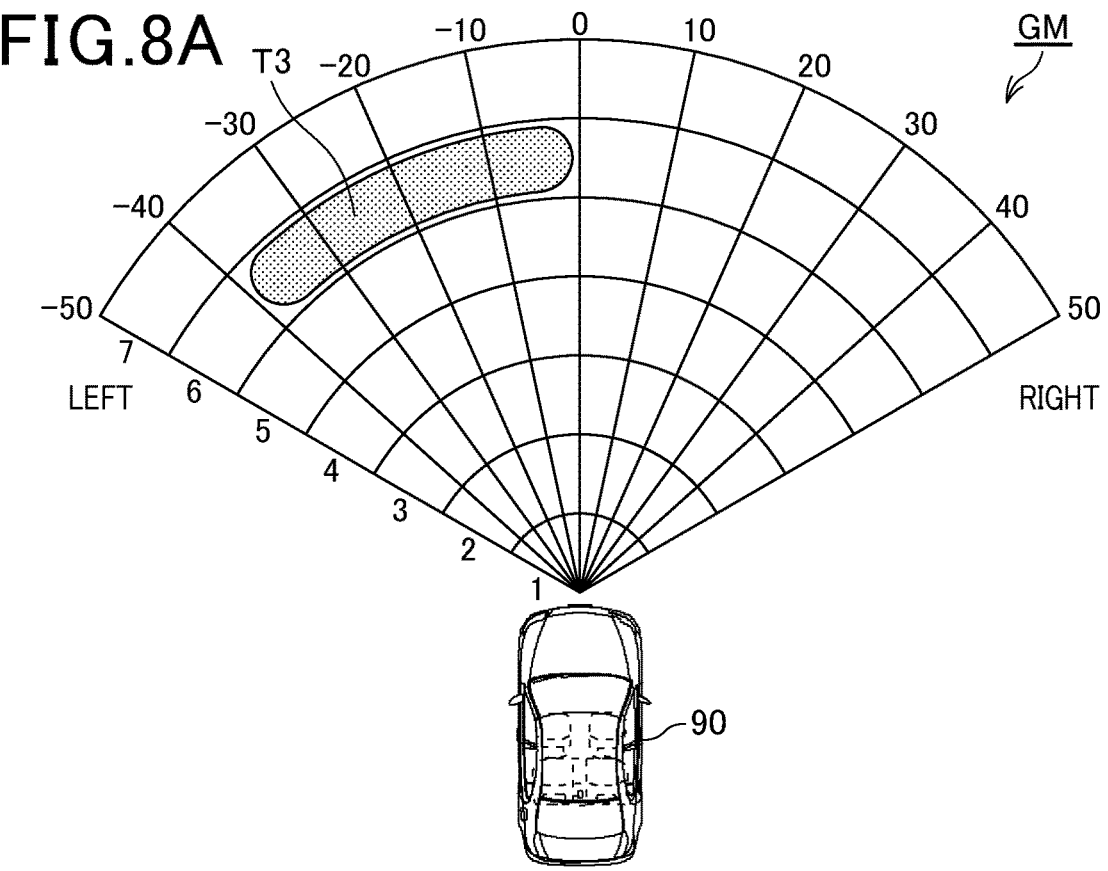
FIG. 8A is a diagram illustrating an example of object detection for the case where the same object exists over a plurality of grid cells.
Figure 8B:
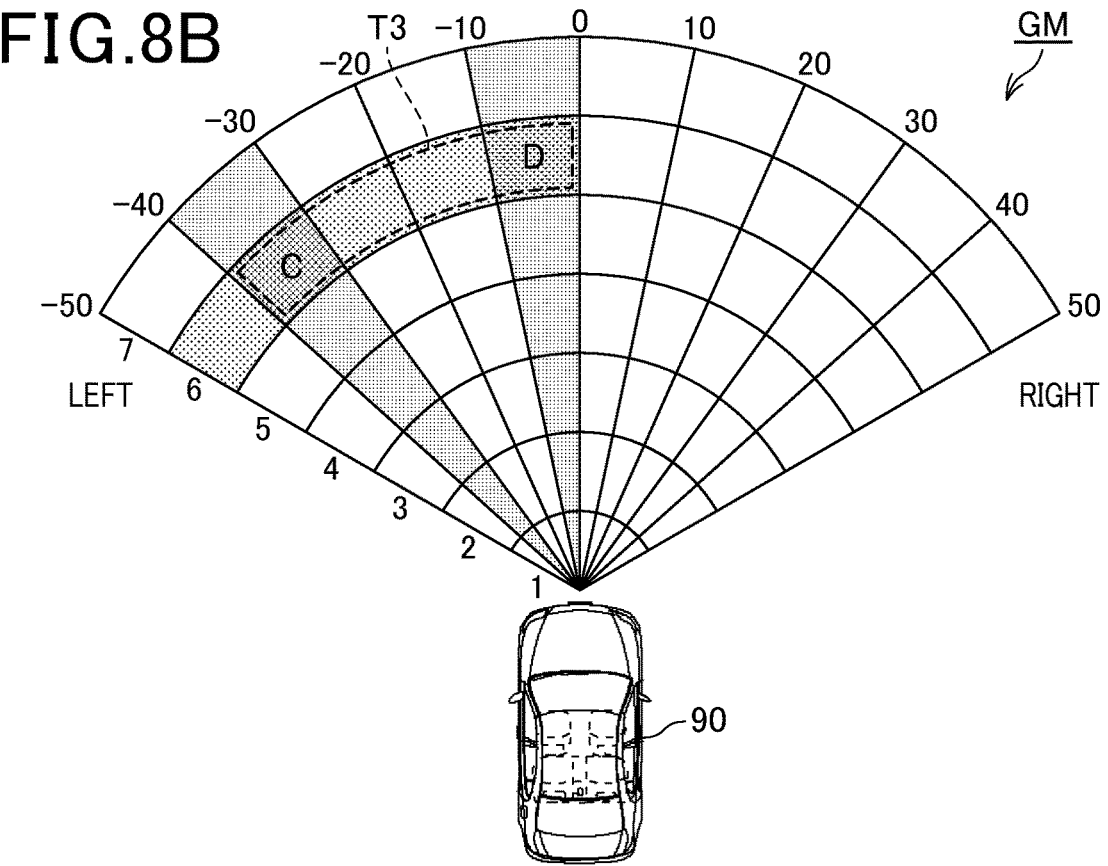
FIG. 8B is a diagram illustrating an example of object detection for the case where the same object exists over a plurality of grid cells.
Figure 8C:
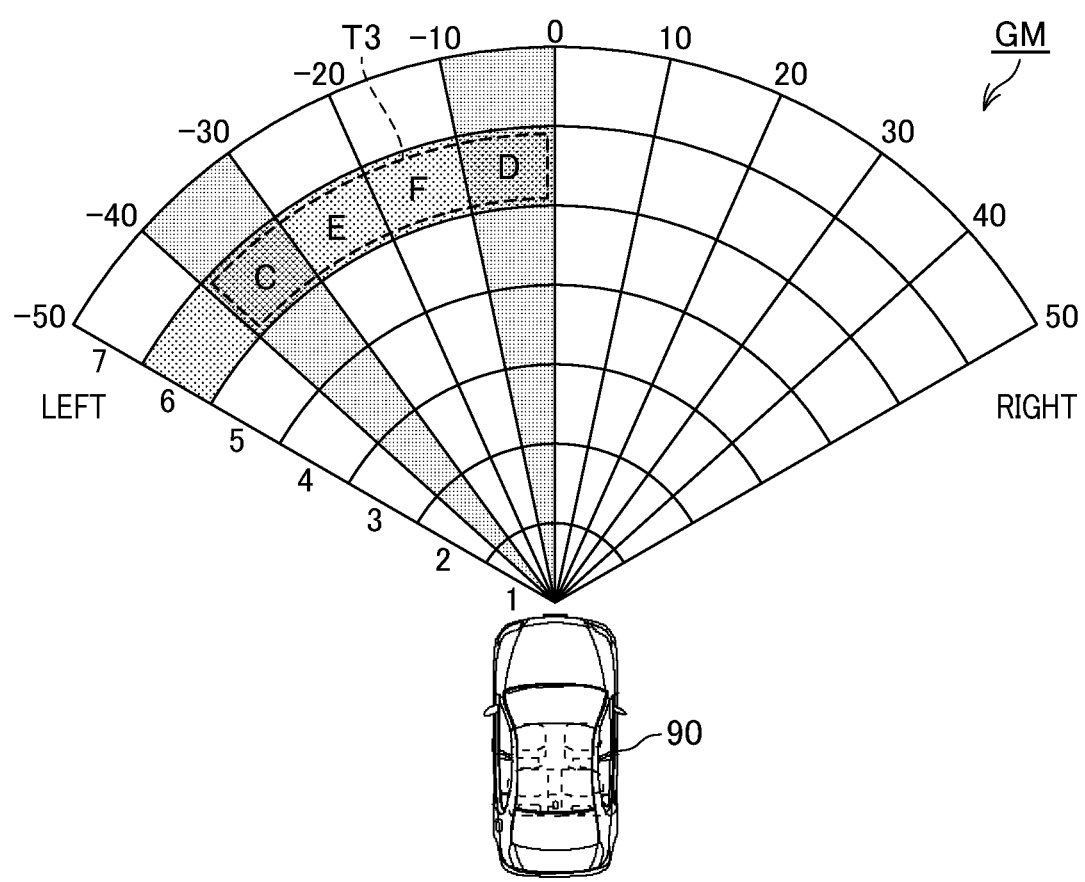
FIG. 8C is a diagram illustrating an example of object detection for the case where the same object exists over a plurality of grid cells.

The object detection device 1 according to the present embodiment identifies the grid cell where the object exists on the basis of the bearing data and the distance data using the position identification unit 30 (S22). FIG. 8 shows diagrams for explaining object detection for the case where the same object exists over a plurality of grid cells. In the example illustrated in FIG. 8A, an object T3 exists diagonally ahead of the vehicle 90 on the left. When the same object exists over a plurality of grid cells in this manner, the object detection device might erroneously identify a plurality of non-continuous grid cells as the grid cells where the object exists. Specifically, in the example illustrated in FIG. 8A, it is desirable that the four continuous grid cells be identified as the grid cells where the object T3 exists. However, the object detection device might erroneously identify the two non-continuous grid cells C and D as the grid cells where the object T3 exists, as illustrated in FIG. 8B. That is, when the same object exists over a plurality of grid cells, the object detection device might erroneously detect the same object as a plurality of different objects. The cause of such a phenomenon is, for example, limitations on the detection ranges of bearing sensors, distance sensors, and the like or data characteristics of detection results. In view of this, the object detection device 1 according to the present embodiment is configured such that the position identification unit 30 identifies an object on the basis of the result of object detection from image data, and correlates the identified object with the grid cells where the object exists (S23). Specifically, the position identification unit 30 first performs an edge detection process (feature extraction process) on the image data acquired from the camera ECU 12. Note that the edge detection process may be executed by the camera ECU 12, and in this case, the result of processing may be input to the position identification unit 30. The position identification unit 30 determines whether the objects detected in a plurality of grid cells are the same object on the basis of the result of edge detection. For example, the results of edge detection (results of feature point extraction) in the same image region differ between the case where one object exists in the image region and the case where a plurality of different objects exist in the image region. The position identification unit 30 uses this detection property to identify the objects detected in a plurality of grid cells. In other words, the position identification unit 30 identifies the object existing over a plurality of grid cells on the basis of the result of object detection from image data. As a result, when the objects detected in the plurality of grid cells are the same object, the position identification unit 30 correlates the identified object with the grid cells where the object exists. Specifically, as illustrated in FIG. 8C, the position identification unit 30 correlates, as the grid cells where the object T3 exists, not only the grid cells C and D identified as the grid cells where the object T3 exists but also the grid cells E and F located between the grid cells C and D. That is, the position identification unit 30 correlates the four continuous grid cells C, D, E, and F as the grid cells where the object T3 exists.

The object detection device 1 according to the present embodiment identifies the grid cell where an object exists on the basis of bearing data and distance data. Furthermore, the object detection device 1 correlates the object identified on the basis of the result of detection from image data with the grid cells where the object exists. Consequently, even when the object T3 existing over a plurality of grid cells is detected intermittently on the polar-coordinate grid map GM as illustrated in FIG. 8B, for example, the object detection device 1 according to the present embodiment can accurately identify the position of the object on the basis of the result of image analysis. In other words, even when a plurality of non-continuous grid cells are identified as the grid cells where the same object exists, the object detection device 1 according to the present embodiment can use the result of image analysis to increase the accuracy of the technique of identifying the position of the object on the basis of bearing data and distance data. Another advantageous effect is that no object recognition processing is required in subsequent steps because the image analysis has already been performed.

The scope of the present disclosure is not limited to the object detection device and the object detection method described above in detail with reference to specific embodiments according to the present disclosure.

In the above embodiments, the sonar 21 is used as an example of a distance sensor. However, instead of the sonar, a millimeter-wave radar or a Lidar sensor can be used as a distance sensor, for example. In addition, instead of the camera, a Lidar sensor can be used as a bearing sensor, for example.

In the examples described in the above embodiments, distance data are stored in the storage unit 23 connected to the sonar ECU 22, and bearing data are stored in the storage unit 13 connected to the camera ECU 12. Alternatively, for example, distance data may be stored in a memory provided in the sonar ECU 22. Bearing data may be stored in a memory provided in the camera ECU 12. That is, distance data and bearing data may be stored in either a memory provided in the ECU or a storage device connected to the ECU as long as these data can be used for other functions such as vehicle control.

Figure 9:
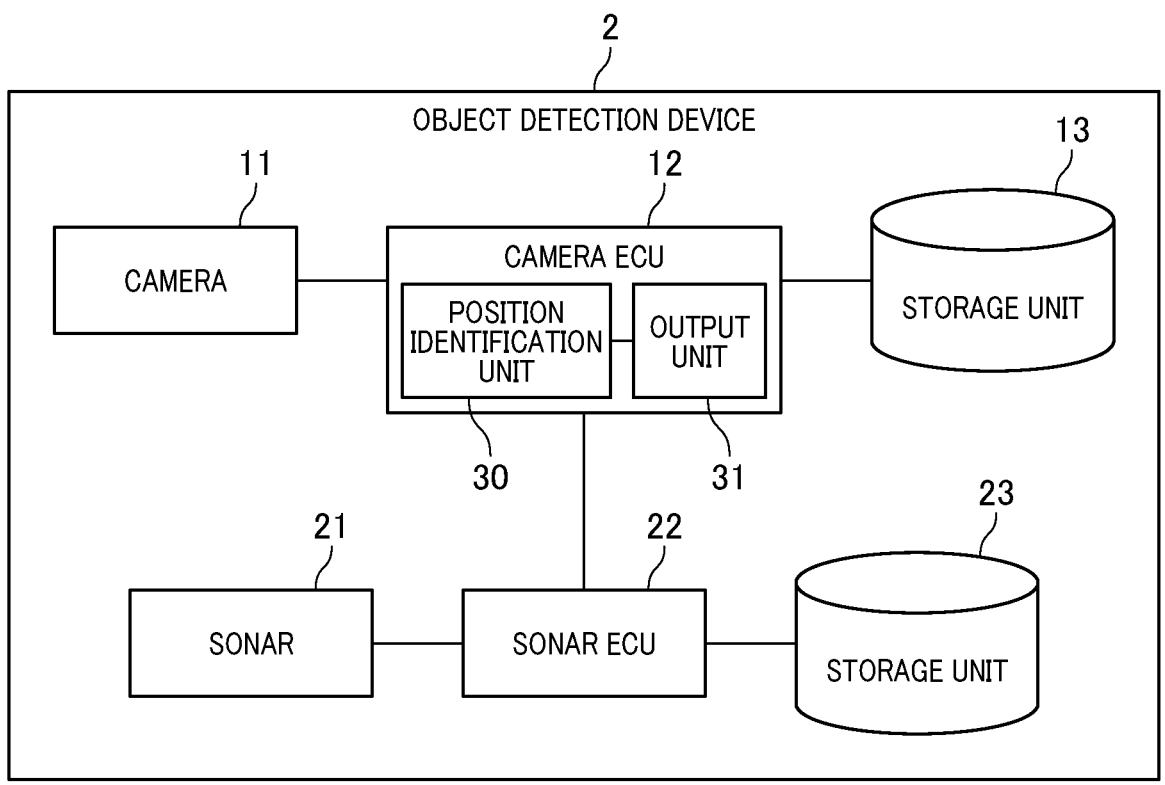
FIG. 9 is a diagram illustrating the configuration of an object detection device according to a modification.

In the examples described in the above embodiments, the ECU that implements the function of the position identification unit 30 is different from the camera ECU 12 and the sonar ECU 22. Alternatively, as illustrated in FIG. 9, for example, an object detection device 2 may include the camera ECU 12 that serves as the ECU that implements the function of the position identification unit 30. In this manner, it is preferable that the technique of the present disclosure be implemented with as few ECUs as possible.

What is claimed is:

1. An object detection device comprising:
   a camera configured to capture an image of an object existing around a vehicle as image data;
   an image processing unit configured to detect the object from the image captured using the camera, and to obtain bearing data on a bearing of the detected object;
   a distance sensor configured to obtain distance data on a distance from the vehicle to the object; and
   a position identification unit configured to identify a grid cell where the object exists on a grid map that is based on a polar coordinate system whose center is the vehicle on the basis of the bearing data obtained from the image processing unit and the distance data obtained from the distance sensor, wherein
   in response to a plurality of objects being detected in a plurality of grid cells and a plurality of non-continuous grid cells being identified as the grid cells where the object exists, the position identification unit is configured to:
   determine whether the plurality of objects detected in the plurality of non-continuous grid cells are a same object on the basis of a result of an edge detection from the image data obtained from the image processing unit;
   identify the same object existing over the plurality of non-continuous grid cells; and
   correlate the identified same object with a plurality of continuous grid cells where the same object exists.

2. The object detection device according to claim 1, wherein
   the distance sensor is a sonar, a millimeter-wave radar, or a Lidar sensor.

3. The object detection device according to claim 1, comprising:
   a bearing sensor ECU that controls a bearing sensor; and
   a distance sensor ECU that controls the distance sensor, wherein
   the bearing sensor ECU stores, in a memory, the bearing data measured using the bearing sensor,
   the distance sensor ECU stores, in a memory, the distance data measured using the distance sensor, and
   the position identification unit identifies the position of the object by combining the bearing data stored in the bearing sensor ECU and the distance data stored in the distance sensor ECU.

4. An object detection method comprising the steps of:
   acquiring bearing data on a bearing of an object existing around a vehicle from a bearing sensor provided on the vehicle;
   acquiring distance data on a distance from the vehicle to the object from a distance sensor provided on the vehicle; and identifying a grid cell where the object exists on a grid map that is based on a polar coordinate system whose center is the vehicle on the basis of the bearing data and the distance data;

in response to a plurality of objects being detected in a plurality of grid cells and a plurality of non-continuous grid cells being identified as the grid cells where the object exists, determining whether the plurality of objects detected in the plurality of non-continuous grid cells are a same object on the basis of a result of an edge detection from image;

identifying the same object existing over the plurality of non-continuous grid cells; and correlating the identified same object with a plurality of continuous grid cells where the same object exists.

5. A non-transitory tangible computer-readable storage medium containing thereon a program for detecting an object existing around a vehicle, the program being configured to cause an ECU to execute the program comprising instructions, the instructions comprising:

acquiring bearing data on a bearing of the object existing around the vehicle from a bearing sensor provided on the vehicle;

acquiring distance data on a distance from the vehicle to the object from a distance sensor provided on the vehicle;

identifying a grid cell where the object exists on a grid map that is based on a polar coordinate system whose center is the vehicle on the basis of the bearing data and the distance data;

in response to a plurality of objects being detected in a plurality of grid cells and a plurality of non-continuous grid cells being identified as the grid cells where the object exists, determining whether the plurality of objects detected in the plurality of non-continuous grid cells are a same object on the basis of a result of an edge detection from image data;

identifying the same object existing over the plurality of non-continuous grid cells; and correlating the identified same object with a plurality of continuous grid cells where the same object exists.

* * * * *